United States Patent
Yan et al.

(10) Patent No.: US 11,805,445 B2
(45) Date of Patent: Oct. 31, 2023

(54) TRAFFIC SHAPING METHOD, NETWORK DEVICE, AND COMPUTER PROGRAM PRODUCT

(71) Applicant: Huawei Technologies Co., Ltd., Shenzhen (CN)

(72) Inventors: Yong Yan, Shanghai (CN); Enhua He, Shanghai (CN); Yan Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 17/556,587

(22) Filed: Dec. 20, 2021

(65) Prior Publication Data

US 2022/0116824 A1    Apr. 14, 2022

Related U.S. Application Data

(63) Continuation of application No. PCT/CN2020/093666, filed on Jun. 1, 2020.

(30) Foreign Application Priority Data

Jun. 20, 2019    (CN) .......................... 201910537573.0

(51) Int. Cl.
*H04L 47/22*    (2022.01)
*H04W 28/08*    (2023.01)
(Continued)

(52) U.S. Cl.
CPC ......... *H04W 28/0958* (2020.05); *H04L 47/22* (2013.01); *H04L 5/14* (2013.01); *H04W 80/02* (2013.01)

(58) Field of Classification Search
CPC ..... H04W 28/09; H04W 72/04; H04W 28/04; H04W 12/10; H04W 1/16; H04W 69/22;
(Continued)

(56) References Cited

U.S. PATENT DOCUMENTS 8,385,199 B1 * 2/2013 Coward .................. H04L 47/22
                                                         370/230.1
8,988,994 B2 * 3/2015 Kumar ................ H04W 28/065
                                                           370/229
(Continued)

FOREIGN PATENT DOCUMENTS

CN            1361640 A      7/2002
CN          102130819 A      7/2011
(Continued)

OTHER PUBLICATIONS

J. Heinanen et al., "A Two Rate Three Color Marker," Request for Comments: 2698, total 5 pages (Sep. 1999).
(Continued)

*Primary Examiner* — Man U Phan
(74) *Attorney, Agent, or Firm* — Leydig, Voit & Mayer, Ltd.

(57) ABSTRACT

This application discloses a traffic shaping method, where the method is applied to a wireless communication time division duplex (TDD) mode. A network device obtains N data packets sent by a terminal device using a shaping layer, where N is an integer greater than 0, the N data packets are submitted in sequence, and the shaping layer is configured to sort the N data packets; the network device compares traffic of the N data packets or a time interval at which the shaping layer sends data packets with a preset value when the network device determines that none of the N data packets is lost or that the N data packets are not out of order; and the network device shapes the traffic based on a comparison result by using the shaping layer.

14 Claims, 7 Drawing Sheets

(51) Int. Cl.
*H04L 5/14* (2006.01)
*H04W 80/02* (2009.01)

(58) Field of Classification Search
CPC . H04W 12/61; H04W 28/02; H04W 36/0011; H04W 36/08; H04W 84/042; H04W 4/70; H04W 76/27; H04L 47/22; H04L 12/28; H04L 5/14; H04L 1/16; H04L 29/06; H04L 80/02; H04L 5/00; H04L 47/41; H04L 9/3236; H04L 9/08
USPC .......................................................... 370/230
See application file for complete search history.

(56) References Cited

U.S. PATENT DOCUMENTS

| | | | | |
|---|---|---|---|---|
| 9,961,585 | B2* | 5/2018 | Szilagyi | H04W 28/0289 |
| 10,070,461 | B2* | 9/2018 | Nuggehalli | H04W 72/542 |
| 10,264,481 | B2* | 4/2019 | Patel | H04W 28/0221 |
| 10,402,296 | B2* | 9/2019 | Takahashi | G05B 13/0265 |
| 10,708,894 | B2* | 7/2020 | Myung | H04W 72/04 |
| 10,813,115 | B2* | 10/2020 | Meylan | H04L 5/0044 |
| 10,820,192 | B2* | 10/2020 | Gage | H04L 12/041 |
| 10,893,515 | B2* | 1/2021 | Myung | H04W 48/12 |
| 10,959,240 | B2* | 3/2021 | Yu | H04W 28/0263 |
| 11,013,002 | B2* | 5/2021 | Lee | H04W 72/0453 |
| 11,166,189 | B2* | 11/2021 | Xu | H04W 80/08 |
| 11,233,725 | B2* | 1/2022 | Zhang | H04L 47/34 |
| 11,296,841 | B2* | 4/2022 | Liu | H04L 69/324 |
| 2014/0341013 | A1 | 11/2014 | Kumar et al. | |
| 2017/0017560 | A1 | 1/2017 | Takahashi et al. | |
| 2018/0376380 | A1* | 12/2018 | Leroux | H04W 76/27 |
| 2019/0098544 | A1 | 3/2019 | Han et al. | |
| 2020/0169916 | A1* | 5/2020 | Gholmieh | H04W 12/106 |
| 2020/0280871 | A1* | 9/2020 | Khirallah | H04W 28/0257 |
| 2022/0053370 | A1* | 2/2022 | Zhuo | H04W 28/0284 |
| 2022/0078661 | A1* | 3/2022 | Wang | H04W 28/0263 |

FOREIGN PATENT DOCUMENTS

| | | |
|---|---|---|
| CN | 102984741 A | 3/2013 |
| CN | 103120008 A | 5/2013 |
| CN | 105515880 A | 4/2016 |
| CN | 105517047 A | 4/2016 |
| CN | 107484204 A | 12/2017 |
| EP | 3461209 A1 | 3/2019 |
| WO | 2009045945 A2 | 4/2009 |
| WO | 2018127225 A1 | 7/2018 |
| WO | 2018225988 A1 | 12/2018 |

OTHER PUBLICATIONS

"3rd Generation Partnership Project; Technical Specification Group Radio Access Network; Evolved Universal Terrestrial Radio Access (E-UTRA); Physical channels and modulation (Release 15)," 3GPP TS 36.211 V15.5.0, total 238 pages, 3rd Generation Partnership Project, Valbonne, France (Mar. 2019).

"3rd Generation Partnership Project; Technical Specification Group Radio Access Network; NR; Physical channels and modulation (Release 15)," 3GPP TS 38.211 V15.5.0, total 96 pages, 3rd Generation Partnership Project, Valbonne, France (Mar. 2019).

"3rd Generation Partnership Project; Technical Specification Group Radio Access Network; NR; Packet Data Convergence Protocol (PDCP) specification (Release 15)," 3GPP TS 38.323 V15.5.0, total 26 pages, 3rd Generation Partnership Project, Valbonne, France (Mar. 2019).

"3rd Generation Partnership Project; Technical Specification Group Radio Access Network; Evolved Universal Terrestrial Radio Access (E-UTRA); Radio Link Control (RLC) protocol specification (Release 15)," 3GPP TS 36.322 V15.1.0, total 45 pages, 3rd Generation Partnership Project, Valbonne, France (Jul. 2018).

"3rd Generation Partnership Project; Technical Specification Group Radio Access Network; NR; Radio Link Control (RLC) protocol specification (Release 15)," 3GPP TS 38.322 V15.5.0, total 33 pages, 3rd Generation Partnership Project, Valbonne, France (Mar. 2019).

* cited by examiner

TRAFFIC SHAPING METHOD, NETWORK DEVICE, AND COMPUTER PROGRAM PRODUCT

CROSS-REFERENCE TO RELATED APPLICATIONS

This application is a continuation of International Application No. PCT/CN2020/093666, filed on Jun. 1, 2020, which claims priority to Chinese Patent Application No. 201910537573.0, filed on Jun. 20, 2019. The disclosures of the aforementioned applications are hereby incorporated by reference in their entireties.

TECHNICAL FIELD

This application relates to the field of communication technologies, and specifically, to a traffic shaping method, a network device, and a computer program product.

BACKGROUND

The 5th generation mobile communication technology (5G) brings ultra-high-speed networks to users, which greatly improves user experience. At the same time, significant transmission pressure is put on network devices such as switches. When network congestion occurs, switches and routers generally adopt a link-based packet discarding policy, that is, packets are evenly discarded for Internet Protocol (IP) link data that exceeds a specific limit. A packet loss is fatal to a protocol such as a transmission control protocol (TCP) requiring reliable transmission, and causes a window of the protocol to collapse quickly, severely affecting a transmission rate and degrading user experience.

Traffic shaping, also referred to as traffic shaping, is an important means to improve data transmission efficiency and quality, reduce or even avoid a packet loss, optimize service transmission performance, and improve user perception. Traffic shaping determines system performance to a specific extent. Currently, only traffic shaping at an IP layer of a transmission network is specified, that is, traffic shaping is performed on a non-radio air interface side, to stably send data and avoid a packet loss. Solutions of traffic shaping at a packet data convergence protocol (PDCP) layer on a 5G network device side and at a radio link control (RLC) layer on a 4G network device side are not specified.

SUMMARY

Embodiments of this application provide a traffic shaping method, to resolve a problem of an instantaneous traffic burst that may occur after a shaping layer receives a lower-layer data packet.

To achieve the foregoing objective, the embodiments of this application provide the following technical solutions.

According to a first aspect of this application, a traffic shaping method is provided. The method is applied to a wireless communication time division duplex (TDD) mode, for example, may be applied to a TDD system such as long term evolution (LTE) and 5G. The method may include: A network device obtains, by using a shaping layer, N data packets sent by a terminal device, where N is an integer greater than 0, the N data packets are submitted in sequence, and the shaping layer is configured to sort the N data packets; the network device compares traffic of the N data packets or a time interval at which the shaping layer sends data packets with a preset value when the network device determines that none of the N data packets is lost or that the N data packets are not out of order; and the network device shapes the traffic based on a comparison result by using the shaping layer. The network device compares the traffic of the N data packets or the time interval at which the shaping layer sends data packets with the preset value, and shapes the traffic based on the comparison result by using the shaping layer. In a 5G communication system, the shaping layer may be a PDCP layer. In an LTE communication system, the shaping layer may be an RLC layer.

Optionally, with reference to the first aspect, in a first embodiment, that the network device compares traffic of the N data packets or a time interval at which the shaping layer sends data packets with a preset value may include: The network device determines whether the traffic of the N data packets reaches a first preset value. Correspondingly, that the network device shapes the traffic based on a comparison result by using the shaping layer may include: If the traffic reaches the first preset value, the network device sends M data packets to a transmission network in a current time period by using the shaping layer, where traffic of the M data packets is rounded up to the first preset value. Instantaneous burst traffic is shaped by setting a shaping condition that whether the traffic of the N data packets reaches the first preset value, to reduce a burst rate. When the traffic reaches the preset value, the shaping layer sends maximum traffic that can be allowed to be sent in a current slot or subframe. This resolves a problem of an instantaneous traffic burst that may occur after the shaping layer receives a lower-layer data packet, reduces an instantaneous egress rate, reduces a packet loss on a transmission network without introducing a large delay, and improves service experience in a wireless communication TDD system.

Optionally, with reference to the first aspect, in a second embodiment, that the network device compares traffic of the N data packets or a time interval at which the shaping layer sends data packets with a preset value may include: The network device determines whether the time interval at which the shaping layer sends data packets reaches a second preset value. Correspondingly, that the network device shapes the traffic based on a comparison result by using the shaping layer may include: If the time interval reaches the second preset value, the network device sends M data packets to a transmission network in a current time period by using the shaping layer, where traffic of the M data packets is rounded up to a first preset value, and the first preset value is preset. Instantaneous burst traffic is shaped by setting a shaping condition that whether the time interval at which the shaping layer sends data packets reaches the second preset value, to reduce a burst rate. When the time interval reaches the preset value, the shaping layer sends maximum traffic that can be allowed to be sent in a current slot or subframe, thereby reducing a packet loss on a transmission network without introducing a large delay, and improving service experience in a wireless communication TDD system.

Optionally, with reference to the first aspect, in a third embodiment, that the network device compares traffic of the N data packets or a time interval at which the shaping layer sends data packets with a preset value may include: The network device determines whether the traffic of the N data packets reaches a first preset value; and the network device determines whether the time interval at which the shaping layer sends data packets reaches a second preset value. Correspondingly, that the network device shapes the traffic based on a comparison result by using the shaping layer may include:

If the traffic of the N data packets does not reach the first preset value and the time interval at which the shaping layer sends data packets does not reach the second preset value, the network device sends the traffic of the N data packets to a transmission network in P time units by using the shaping layer, where P is a ratio of the second preset value to the time interval at which the shaping layer sends data packets. When the traffic of the N data packets does not reach the first preset value and the time interval at which the shaping layer sends data packets does not reach the second preset value, the traffic of the N data packets is sent to the transmission network in P slots or subframes. This avoids sending of a large amount of data in one slot or subframe. In a multi-user scenario, network utilization can be significantly improved in this embodiment of this application.

Optionally, with reference to the third embodiment of the first aspect, in a fourth embodiment, that the network device sends the traffic of the N data packets to a transmission network in P time units by using the shaping layer may include: The network device sends the traffic of the N data packets to the transmission network averagely in the P time units by using the shaping layer.

Optionally, with reference to the first aspect or the first to the fourth embodiments of the first aspect, in a fifth embodiment, the shaping layer is a packet data convergence protocol (PDCP) layer of the network device in a 5th generation mobile communication technology (5G) system.

Optionally, with reference to the first aspect or the first to the fourth embodiments of the first aspect, in a sixth embodiment, the shaping layer is a radio link control (RLC) layer of the network device in a long term evolution (LTE) system.

According to a second aspect of this application, a network device is provided, and may include: a communication interface, configured to obtain N data packets sent by a terminal device by using a shaping layer, where N is an integer greater than 0, the N data packets are submitted in sequence, and the shaping layer is configured to sort the N data packets; and a processor, where the processor is coupled to the communication interface, and is configured to compare traffic of the N data packets or a time interval at which the shaping layer sends data packets with a preset value when the processor determines that none of the N data packets obtained by the communication interface is lost or that the N data packets are not out of order. The communication interface is further configured to shape the traffic based on a comparison result of the processor by using the shaping layer.

Optionally, with reference to the second aspect, in a first embodiment, the processor is specifically configured to determine whether the traffic of the N data packets obtained by the communication interface reaches a first preset value. The communication interface is specifically configured to send, if the processor determines that the traffic reaches the first preset value, M data packets to a transmission network in a current time period by using the shaping layer, where traffic of the M data packets is rounded up to the first preset value.

Optionally, with reference to the second aspect, in a second embodiment, the processor is specifically configured to determine whether the time interval at which the shaping layer sends data packets reaches a second preset value. The communication interface is specifically configured to send, if the processor determines that the time interval reaches the second preset value, M data packets to a transmission network in a current time period by using the shaping layer, where traffic of the M data packets is rounded up to a first preset value, and the first preset value is preset.

Optionally, with reference to the second aspect, in a third embodiment, the processor is specifically configured to: determine whether the traffic of the N data packets reaches a first preset value, and determine whether the time interval at which the shaping layer sends data packets reaches a second preset value. The communication interface is specifically configured to send, if the processor determines that the traffic of the N data packets does not reach the first preset value and the time interval at which the shaping layer sends data packets does not reach the second preset value, the traffic of the N data packets to a transmission network in P time units by using the shaping layer, where P is a ratio of the second preset value to the time interval at which the shaping layer sends data packets.

Optionally, with reference to the third embodiment of the second aspect, in a fourth embodiment, the communication interface is specifically configured to send the traffic of the N data packets to the transmission network averagely in the P time units by using the shaping layer.

Optionally, with reference to the second aspect or the first to the fourth embodiments of the second aspect, in a fifth embodiment, the shaping layer is a packet data convergence protocol (PDCP) layer of the network device in a 5th generation mobile communication technology (5G) system.

Optionally, with reference to the second aspect or the first to the fourth embodiments of the second aspect, in a sixth embodiment, the shaping layer is a radio link control (RLC) layer of the network device in a long term evolution (LTE) system.

According to a third aspect of this application, a network device is provided, and may include a transceiver unit, configured to obtain N data packets sent by a terminal device by using a shaping layer, where N is an integer greater than 0, the N data packets are submitted in sequence, and the shaping layer is configured to sort the N data packets. The network device further includes a processing unit, configured to compare traffic of the N data packets or a time interval at which the shaping layer sends data packets with a preset value when determining that none of the N data packets obtained by the transceiver unit is lost or that the N data packets are not out of order. The transceiver unit is further configured to shape the traffic based on a comparison result of the processing unit by using the shaping layer.

Optionally, with reference to the third aspect, in a first embodiment, the processing unit is specifically configured to determine whether the traffic of the N data packets obtained by the transceiver unit reaches a first preset value. The transceiver unit is specifically configured to send, if the processing unit determines that the traffic reaches the first preset value, M data packets to a transmission network in a current time period by using the shaping layer, where traffic of the M data packets is rounded up to the first preset value.

Optionally, with reference to the third aspect, in a second embodiment, the processing unit is specifically configured to determine whether the time interval at which the shaping layer sends data packets reaches a second preset value. The transceiver unit is specifically configured to send, if the processing unit determines that the time interval reaches the second preset value, M data packets to a transmission network in a current time period by using the shaping layer, where traffic of the M data packets is rounded up to a first preset value, and the first preset value is preset.

Optionally, with reference to the third aspect, in a third embodiment, the processing unit is specifically configured to: determine whether the traffic of the N data packets reaches a first preset value, and determine whether the time interval at which the shaping layer sends data packets reaches a second preset value. The transceiver unit is specifically configured to send, if the processing unit determines that the traffic of the N data packets does not reach the first preset value and the time interval at which the shaping layer sends data packets does not reach the second preset value, the traffic of the N data packets to a transmission network in P time units by using the shaping layer, where P is a ratio of the second preset value to the time interval at which the shaping layer sends data packets.

Optionally, with reference to the third embodiment of the third aspect, in a fourth embodiment, the transceiver unit is specifically configured to send the traffic of the N data packets to the transmission network averagely in the P time units by using the shaping layer.

Optionally, with reference to the third aspect or the first to the fourth embodiments of the third aspect, in a fifth embodiment, the shaping layer is a packet data convergence protocol (PDCP) layer of the network device in a 5th generation mobile communication technology (5G) system.

Optionally, with reference to the third aspect or the first to the fourth embodiments of the third aspect, in a sixth embodiment, the shaping layer is a radio link control (RLC) layer of the network device in a long term evolution (LTE) system.

A fourth aspect of this application provides a computer-readable storage medium. The computer-readable storage medium stores instructions; and when the instructions are run on a computer, the computer is enabled to perform the traffic shaping method according to any one of the first aspect or the embodiments of the first aspect.

A fifth aspect of this application provides a computer program product including instructions. When the instructions are run on a computer, the computer is enabled to perform the traffic shaping method according to any one of the first aspect or the embodiments of the first aspect.

A sixth aspect of this application provides a chip system. The chip system includes a processor, configured to support a network device in implementing the functions in any one of the first aspect or the embodiments of the first aspect. In a possible design, the chip system further includes a memory. The memory is configured to store program instructions and data that are necessary for the network device. The chip system may include a chip, or may include a chip and another discrete component.

In the embodiments of this application, the network device compares the traffic of the N data packets or the time interval at which the shaping layer sends data packets with the preset value, and shapes the traffic based on the comparison result by using the shaping layer. In this application, shaping may be performed on traffic by using the shaping layer in different manners.

DESCRIPTION OF EMBODIMENTS

Figure 1:
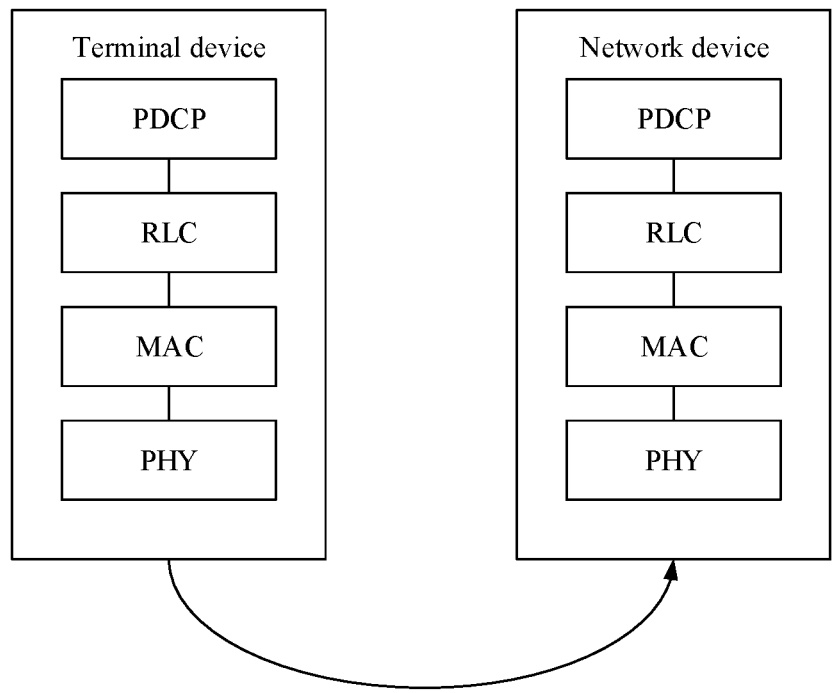
FIG. 1 is a schematic diagram of a radio interface protocol stack.

The following describes the embodiments of this application with reference to the accompanying drawings. It is clear that the described embodiments are merely some but not all of the embodiments of this application. A person of ordinary skill in the art may learn that, with development of technologies and emergence of a new scenario, the technical solutions provided in the embodiments of this application are also applicable to a similar technical problem.

The embodiments of this application provide a traffic shaping method, a network device, and a storage medium. A data capacity threshold, a time threshold, and a determining condition are set, to resolve a problem of an instantaneous traffic burst that may occur after a packet data convergence protocol (PDCP) layer in a 5th generation mobile communication technology (5G) system or a radio link control (RLC) layer of a long term evolution (LTE) system receives a lower-layer data packet, to reduce an instantaneous egress rate. Details are described below separately.

In this application, the specification, the claims, and terms such as "first" and "second" in the accompanying drawings are intended to distinguish between similar objects but do not necessarily indicate a specific order or sequence. It should be understood that data used in such a way are interchangeable in proper cases so that the embodiments described herein can be implemented in an order except the order illustrated or described herein. In addition, terms such as "include" and "have" and any variations thereof are intended to cover non-exclusive inclusions, for example, a process, method, system, product, or device that includes a series of steps or modules is not necessarily limited to those clearly listed steps or modules, but may include other steps or modules that are not clearly listed or inherent to such a process, method, product, or device. Naming or numbering of steps in this application does not mean that steps in the method procedure need to be performed according to a time/logical order indicated by the naming or the numbering. An execution order of process steps that have been named or numbered may be changed according to a technical objective to be implemented, provided that a same or similar technical effect can be achieved. Division into modules in this application is logical division. During actual application, there may be another division manner. For example, a plurality of modules may be combined or integrated into another system, or some features may be ignored or not performed. In addition, the displayed or discussed mutual couplings or direct couplings or communication connections may be implemented through some ports, and indirect couplings or communication connections between modules may be implemented in an electrical form or another similar form. This is not limited in this application.

In addition, modules or submodules described as separate components may or may not be physically separated, may or may not be physical modules, or may be distributed to a plurality of circuit modules. Some or all of the modules may be selected based on an actual requirement to implement the objectives of the solutions of this application.

It should be noted that in the embodiments of this application, the nouns "network" and "system" are usually alternatively used, but a person skilled in the art may understand the meanings. Terms such as "information", "signal", and "message" may be interchangeably used sometimes. It should be noted that meanings expressed by the terms are consistent when differences of the terms are not emphasized.

It should be understood that the network device in this application may be any device that has wireless transceiver functions or a chip that may be disposed on the device. The device includes but is not limited to a base station, an evolved NodeB (evolved node B, eNB), a home base station, an access point (AP) in a wireless fidelity (Wi-Fi) system, a wireless relay node, a wireless backhaul node, a transmission point (TP) or a transmission reception point (TRP), or the like. The device may alternatively be a gNB in an NR system, or may be a component or a part of device that forms a base station, such as a centralized unit (CU), a distributed unit (DU), or a baseband unit (BBU). It should be understood that a specific technology used by a radio access network device and a specific device form are not limited in the embodiments of this application. In this application, the radio access network device is referred to as a network device for short. Unless otherwise specified, in this application, all network devices are radio access network devices. In this application, the network device may be a network device itself, or may be a chip used in the network device to complete a wireless communication processing function.

In some deployments, the gNB may include a CU and a DU. The gNB may further include a radio frequency unit (RU). The CU implements some functions of the gNB, and the DU implements some functions of the gNB. For example, the CU implements functions at a radio resource control (RRC) layer and a packet data convergence protocol (PDCP) layer. The DU implements functions at a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling such as RRC layer signaling or PHCP layer signaling may also be considered as being sent by the DU, or being sent by the DU and the RU. It may be understood that the network device may be a CU node, a DU node, or a device including the CU node and the DU node. In addition, the CU may serve as a network device in a radio access network (RAN), or the CU may serve as a network device in a core network (CN). This is not limited herein.

It should be further understood that the terminal device mentioned in this application may also be referred to as a terminal, user equipment (UE), a mobile station (MS), a mobile terminal (MT), or the like. The terminal device in the embodiments of this application may be a mobile phone, a pad (Pad), a computer that has a wireless transceiver function, or may be a wireless terminal used in scenarios such as virtual reality (VR), augmented reality (AR), industrial control, self driving, remote medical, a smart grid, transportation safety, a smart city, and a smart home. In this application, the foregoing terminal device and a chip that can be used in the foregoing terminal device are collectively referred to as a terminal device. It should be understood that a specific technology used by the terminal device and a specific device form are not limited in the embodiments of this application.

Generally, a 5G communication system or an LTE communication system has a radio interface protocol stack shown in FIG. 1. As shown in FIG. 1, at both a transmit end and a receive end, the radio interface protocol stack includes a packet data convergence protocol (PDCP) layer, a radio link control (RLC) layer, a media access control (MAC) layer, and a physical (PHY) layer. The PHY layer is located at the bottom layer of the protocol stack, and is also referred to as a layer 1. A layer above the PHY layer is referred to as a layer 2. An architecture of a user-plane protocol stack at the layer 2 is further divided into three sublayers: a MAC sublayer, an RLC sublayer, and a PDCP sublayer respectively from bottom to top. In FIG. 1, an example in which a terminal device is the transmit end and an access network device is the receive end is used. Data packets are sequentially transmitted from the PDCP layer of the terminal device to the RLC layer, then transmitted from the RLC layer to the MAC layer, subsequently transmitted from the MAC layer to the PHY layer, and finally sent to the access network device over an air interface. A process is similar when the access network device is the transmit end and the terminal device is the receive end. Specifically, for each sublayer, an information unit from a higher sublayer is referred to as a service data unit (SDU) of the sublayer. An information unit obtained after processing is performed at the sublayer and sent to a next sublayer is referred to as a protocol data unit (PDU) of the sublayer. The PDCP sublayer assigns serial numbers (SNs) to data packets from a higher layer, performs operations such as header compression, encryption, integrity protection, and header addition to form a data PDU, and sends the data PDU to the RLC sublayer. For example, the PDCP sublayer may assign an SN to an IP packet received from an Internet Protocol (IP) layer, perform operations such as header compression, encryption, integrity protection, and header addition to form a data PDU, and send the data PDU to the RLC sublayer. After receiving PDUs from the PDCP sublayer, the RCL sublayer cascades a plurality of received PDUs or PDU segments and assigns only one SN. The RCL sublayer adds an RLC header to form an RLC data PDU. The PDU and the SDU are collectively referred to as "data packet", "data block", or "packet" below. However, a person skilled in the art should understand that, in different scenarios, a data packet, a data block, or a packet represents a PDU or an SDU.

However, in a mobile communication system using a time division duplex (TDD) mode, the network device allocates few time domain resources to an uplink by using the MAC layer. After retransmission is performed over the air interface, if sequential submitting is chosen to be performed, the PDCP layer needs to wait for a retransmitted packet. For example, in different communication systems, different protocol architecture layers may wait for the retransmitted packet. For example, an RLC layer waits for a retransmitted packet in an LTE system. With development of technologies, another execution body may wait for a retransmitted packet. The embodiments of this application do not limit an execution body that waits for a retransmitted packet. As a result, burst data traffic at the PDCP layer or the RLC layer is greatly increased, and a probability of a packet loss on a transmission network is further increased. To clearly illustrate the problem, the following describes the problem with reference to tables.

Table 1 shows an uplink-downlink time domain resource configuration in an existing LTE TDD system. As shown in Table 1, D represents a downlink time domain resource configured by the network device by using the MAC layer, U represents an uplink time domain resource configured by the network device by using the MAC layer, and a ratio of uplink-downlink time-frequency resources with regard to an uplink-downlink configuration number 5 is 1:9. Table 2 shows an uplink-downlink time domain resource configuration in an existing 5G TDD system. As shown in Table 2, D represents a downlink time domain resource configured by the network device by using the MAC layer, U represents an uplink time domain resource configured by the network device by using the MAC layer, and a ratio of uplink-downlink time-frequency resources with regard to an uplink-downlink configuration number 0 is 2:8. It can be learned from Table 1 and Table 2 that, no matter whether in the LTE TDD system or in the 5G TDD system, the network device allocates few time domain resources to the uplink by using the MAC layer.

TABLE 1

| Uplink-downlink configuration number | Uplink-downlink periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | D | U | U | U | D | D | U | U | U |
| 1 | 5 ms | D | D | U | U | D | D | D | U | U | D |
| 2 | 5 ms | D | D | U | D | D | D | D | U | D | D |
| 3 | 10 ms | D | D | U | U | U | D | D | D | D | D |
| 4 | 10 ms | D | D | U | U | D | D | D | D | D | D |
| 5 | 10 ms | D | D | U | D | D | D | D | D | D | D |
| 6 | 5 ms | D | D | U | U | U | D | D | U | U | D |

TABLE 2

| Uplink-downlink configuration number | Uplink-downlink periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 2.5 ms | D | D | D | D | U | D | D | D | D | U |
| 1 | 5 ms | D | D | D | D | D | D | D | D | U | U |
| 2 | 5 ms | D | D | D | D | D | D | D | U | U | U |

The network device allocates few time domain resources to the uplink by using the MAC layer. As a result, burst data traffic at the PDCP layer or the RLC layer is greatly increased, and a probability of a packet loss on a transmission network is further increased. With reference to Table 3 and Table 4, the following uses a 5G communication system as an example for description. Table 3 is a frame structure in a 5G communication system. It is assumed that an ingress rate is 40 Mbps, packets are averagely sent within milliseconds, four packets are sent in each slot, and a ratio of uplink-downlink slots is 1:4. In this application, the ingress rate may be a rate of sending a packet from the RLC layer to the MAC layer of the terminal device. In this case, uplink data packets in the first four slots need to be transmitted in the fifth slot. Actually, 20 data packets need to be sent in each uplink slot, and a rate in the fifth slot may reach 200 Mbps, that is, an egress rate is 200 Mbps. In this application, the egress rate may be a rate of sending a packet from the MAC layer to the RLC layer of the network device. After retransmission is performed over the air interface, if sequential submitting is chosen to be performed, the PDCP layer needs to wait for a retransmitted packet. In this case, burst traffic at the PDCP layer is larger. The following provides descriptions with reference to Table 4. Table 4 shows a process of reordering and sequential submitting at the PDCP layer. As shown in Table 4, it is assumed that in a slot 4 of a frame with a frame number n, the terminal device sends a data block 1 (DATA1) by using the MAC layer, and the MAC layer on the network device side does not correctly receive DATA1. In a slot 9, a slot 14, and a slot 19 of the frame with the frame number n, the terminal device sends a data block 2 (DATA2), a data block 3 (DATA3), and a data block 4 (DATA4) respectively by using the MAC layer, and the MAC layer on the network device side correctly receives DATA2, DATA3, and DATA4. DATA2, DATA3, and DATA4 are transmitted from the MAC layer of the network device to the RLC layer in sequence, and then transmitted from the RLC layer to the PDCP layer. The PDCP layer needs to sort DATA1, DATA2, DATA3, and DATA4 before sending the data blocks to a higher layer. Because DATA1 is not correctly received, DATA2, DATA3, and DATA4 are buffered at the PDCP layer until DATA1 is correctly received. It is assumed that in a slot 4 of a frame with a frame number n+1, the terminal device resends DATA1 by using the MAC layer, and the MAC layer of the network device correctly receives DATA1, the PDCP layer on the network device side sorts DATA1, DATA2, DATA3, and DATA4 and then sends the data blocks to a higher layer. It should be noted that, in the slot 4 of the frame with the frame number n+1, uplink data packets in the first four slots of the frame with the frame number n+1 further need to be sent. If DATA1 is still not correctly transmitted in the slot 4 of the frame with the frame number n+1, retransmission continues, and the PDCP layer waits for reordering. This may result in larger burst traffic or a larger burst rate.

TABLE 3

| | D | D | D | D | U |
|---|---|---|---|---|---|
| Time (slot) | 0.5 ms | 0.5 ms | 0.5 ms | 0.5 ms | 0.5 ms |
| Time (ms) | | 1 ms | | 1 ms | |
| Quantity of data packets | 4 | 4 | 4 | 4 | 4 |

TABLE 4

| | Frame number n | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| Slot | D | D | D | D | U | D | D | D | D | U | D | D | D | D |
| Sequence number of data sent by the terminal | | | | | DATA1 | | | | | DATA2 | | | | |
| Check whether data is correctly received at the MAC layer on the network device side | | | | | Not correctly received | | | | | Correctly received | | | | |

TABLE 4-continued

| Data received at the RLC | | | | | | | DATA2 | | | | |
|---|---|---|---|---|---|---|---|---|---|---|---|
| | Frame number n | | | | | | Frame number n + 1 | | | | |
| Slot | 14<br>U | 15<br>D | 16<br>D | 17<br>D | 18<br>D | 19<br>U | 0<br>D | 1<br>D | 2<br>D | 3<br>D | 4<br>U |
| Sequence number of data sent by the terminal | DATA3 | | | | DATA4 | | | | | | Retransmit DATA1 |
| Check whether data is correctly received at the MAC layer on the network device side | Correctly received | | | | Correctly received | | | | | | Correctly received |
| Data received at the RLC | DATA2<br>DATA3 | | | | DATA2<br>DATA3 | | | | | | |

Traffic shaping is an important means to improve data transmission efficiency and quality, reduce or even avoid a packet loss, optimize service transmission performance, and improve user perception. Traffic shaping is usually implemented by using a buffer and a token bucket. When packets are sent at an excessively high speed, the packets are first buffered in the buffer. The buffered packets are sent averagely under control of the token bucket. However, in the conventional technology, only traffic shaping at an IP layer of a transmission network is specified, and solutions of traffic shaping at a PDCP layer on a 5G network device side and at an RLC layer on a 4G network device side are not specified. The existing traffic shaping solution causes large burst traffic at the PDCP layer or the RLC layer after data packets pass through the MAC layer, causing a great impact on a transmission network. In other words, in the conventional technology, traffic shaping at the IP layer of the transmission network cannot resolve a problem of large burst traffic at the PDCP layer or the RLC layer, causing low network utilization, and causing a packet loss or a delay in the transmission network.

To resolve the foregoing technical problems, the embodiments of this application provide a traffic shaping method, which is described in detail below.

Figure 2:
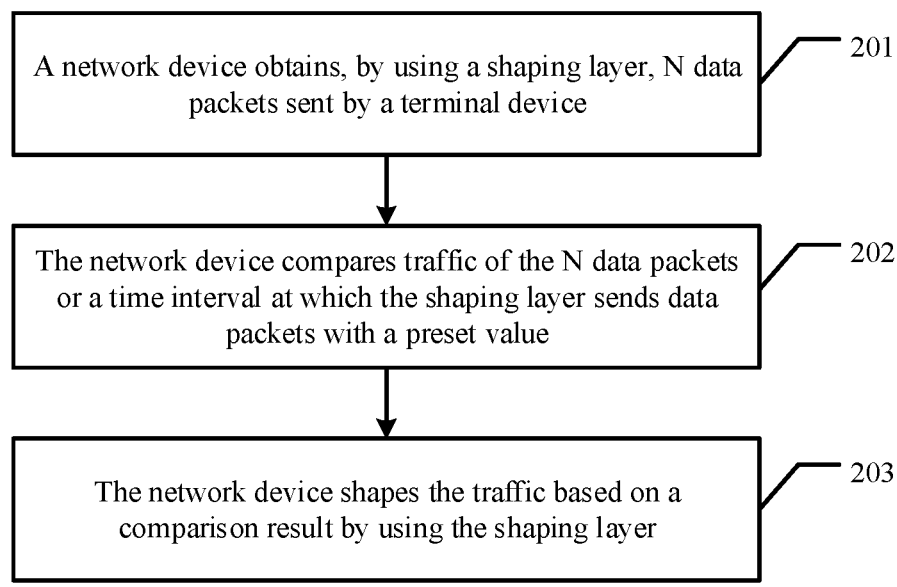
FIG. 2 is a schematic flowchart of a traffic shaping method according to an embodiment of this application.

FIG. 2 is a schematic flowchart of a traffic shaping method according to an embodiment of this application.

As shown in FIG. 2, the traffic shaping method provided in this embodiment of this application may include the following steps.

201. A network device obtains, by using a shaping layer, N data packets sent by a terminal device.

The network device obtains, by using the shaping layer, the N data packets sent by the terminal device, where N is an integer greater than 0. After retransmission is performed over an air interface, if sequential submitting is chosen to be performed, the N data packets are submitted in sequence, and the shaping layer is used to sort the N data packets.

202. The network device compares traffic of the N data packets or a time interval at which the shaping layer sends data packets with a preset value.

The network device compares the traffic of the N data packets or the time interval at which the shaping layer sends data packets with the preset value when the network device determines that none of the N data packets is lost or that the N data packets are not out of order. For example, the preset value preset by the network device includes a first preset value and a second preset value, where the first preset value may be a capacity threshold, and the second preset value may be a time threshold. For example, the capacity threshold may be set to traffic transmitted in one slot or in one subframe based on a minimum bandwidth of a transmission network. The time threshold may be set to an interval of discontinuous uplink slots or subframes. It should be noted that a slot and a subframe are merely a time unit, and the time unit is not limited in the embodiments of this application. To clearly describe the solution, the slot and the subframe are used as examples for description in the embodiments of this application. Details are not described herein again.

203. The network device shapes the traffic based on a comparison result by using the shaping layer.

The network device may shape the traffic by using the shaping layer based on a result of comparing the traffic of the N data packets with the first preset value, or based on a result of comparing the time interval at which the shaping layer sends data packets with the second preset value.

It can be learned from the embodiment corresponding to FIG. 2 that the network device compares the traffic of the N data packets or the time interval at which the shaping layer sends data packets with the preset value, and shapes the traffic based on the comparison result by using the shaping layer. In a 5G communication system, the shaping layer may be a PDCP layer. In an LTE communication system, the shaping layer may be an RLC layer. In addition, the network device may perform shaping on the traffic in different manners based on different comparison results by using the shaping layer. The following describes in detail that the shaping layer performs shaping on the traffic in different manners.

Figure 3:
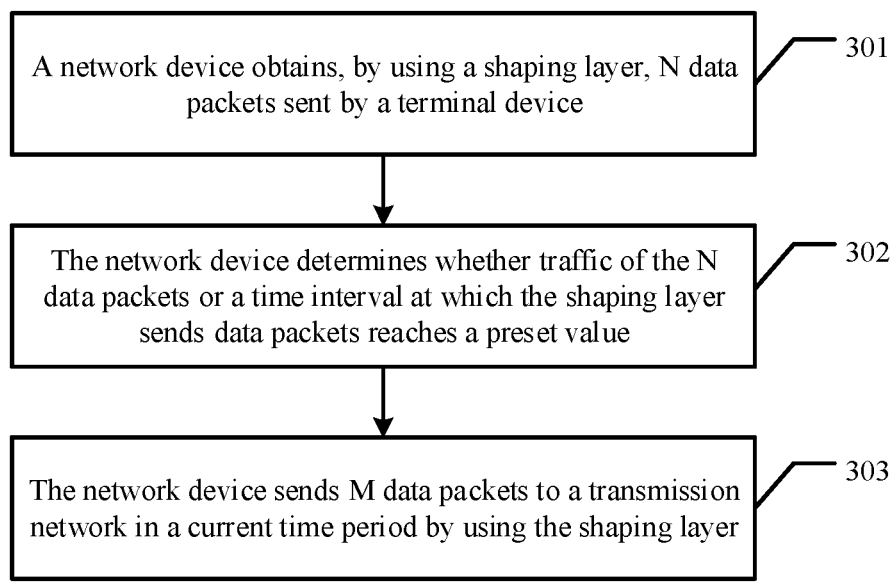
FIG. 3 is a schematic flowchart of a traffic shaping method according to an embodiment of this application.

FIG. 3 is a schematic flowchart of a traffic shaping method according to an embodiment of this application.

As shown in FIG. 3, the traffic shaping method provided in this embodiment of this application may include the following steps.

301. A network device obtains, by using a shaping layer, N data packets sent by a terminal device.

Step 301 may be understood with reference to step 201 in the embodiment corresponding to FIG. 2. Details are not described herein again.

302. The network device determines whether traffic of the N data packets or a time interval at which the shaping layer sends data packets reaches a preset value.

In an embodiment, the network device determines whether the traffic of the N data packets reaches a first preset value. The first preset value may be a capacity threshold. For example, the capacity threshold may be set to traffic transmitted in one slot based on a minimum bandwidth of a transmission network, or the capacity threshold may be set to traffic transmitted in one subframe based on the minimum bandwidth of the transmission network.

In an embodiment, the network device determines whether the time interval at which the shaping layer sends data packets reaches a second preset value. The second preset value may be a time threshold. For example, the time threshold may be set to an interval of discontinuous uplink slots or subframes.

303. The network device sends M data packets to the transmission network in a current time period by using the shaping layer.

In an embodiment, if the traffic reaches the first preset value, the network device sends the M data packets to the transmission network in the current time period by using the shaping layer, where traffic of the M data packets is rounded up to the first preset value.

In an embodiment, if the time interval reaches the second preset value, the network device sends the M data packets to the transmission network in the current time period by using the shaping layer, where traffic of the M data packets is rounded up to the first preset value.

The following separately uses examples in which the shaping layer is a PDCP layer and an RLC layer for description.

Figure 4:
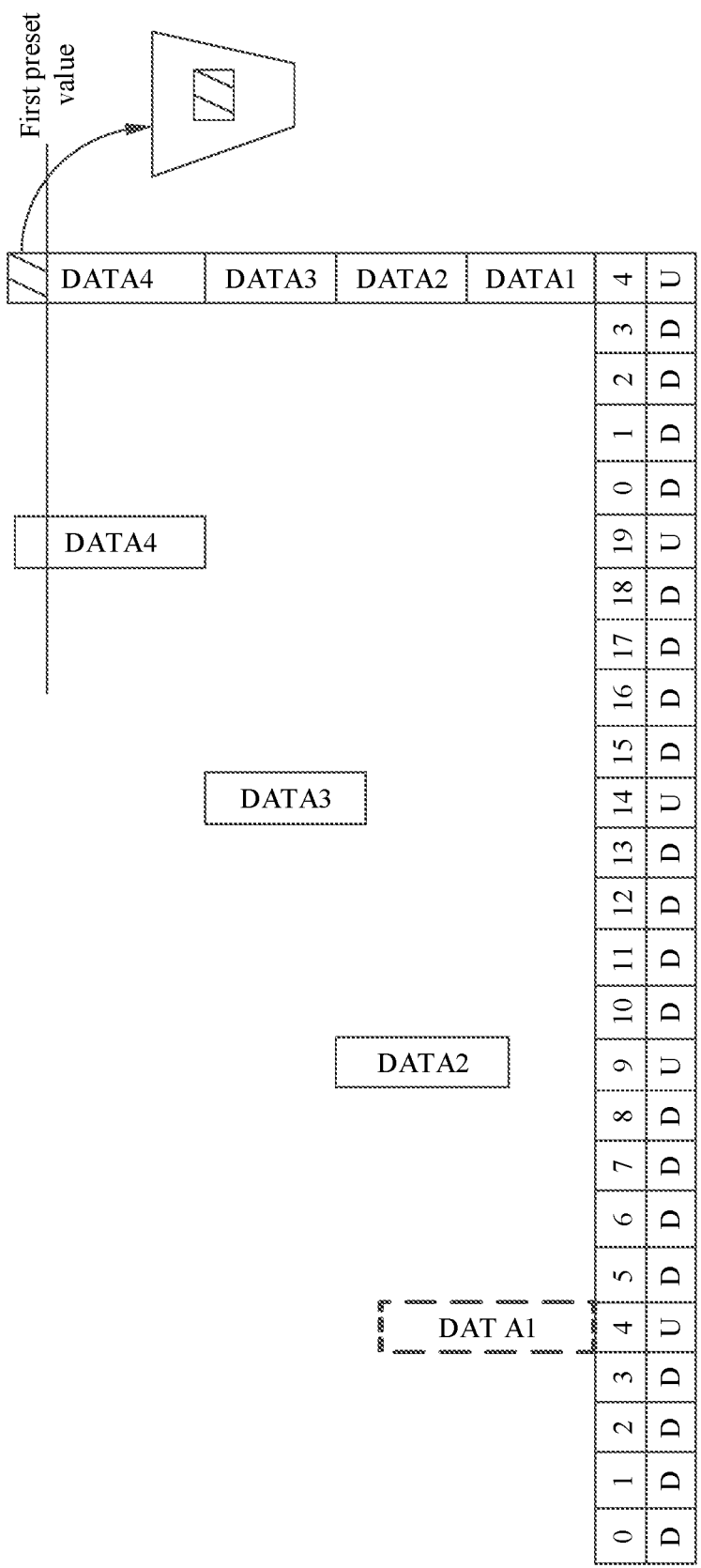
FIG. 4 is a schematic diagram of a traffic shaping process at a PDCP layer according to an embodiment of this application.

FIG. 4 is a schematic diagram of a traffic shaping process at the PDCP layer according to an embodiment of this application.

It is assumed that in a slot 4, the terminal device sends DATA1, but the network device does not receive DATA1. In a slot 9, a slot 14, and a slot 19, the terminal device sends DATA2, DATA3, and DATA4 respectively, and the network device receives DATA2, DATA3, and DATA4 and sends DATA2, DATA3, and DATA4 to a PDCP layer from an RLC layer. In a 5G communication system, after sorting DATA1, DATA2, DATA3, and DATA4, the PDCP layer may send the four data packets to a higher layer. For example, it is assumed that in a next slot 4, the terminal device resends DATA1, and the network device receives the four data packets and sends the four data packets to the PDCP layer from the RLC layer, the PDCP layer may send the four data packets to the higher layer after sorting DATA1, DATA2, DATA3, and DATA4 in the next slot 4.

In an embodiment, after the PDCP layer sorts DATA1, DATA2, DATA3, and DATA4, if the network device determines, by using the PDCP layer, that traffic of the four data packets is not less than the first preset value, the network device determines traffic of M data packets sent in a current slot by using the PDCP layer, where the traffic of the M data packets is rounded up to the first preset value. In other words, maximum traffic that can be allowed to be sent is sent in the current slot. Traffic that exceeds the first preset value is placed into a buffer of the PDCP layer, and remaining traffic continues to be sent in a subsequent slot, where the remaining traffic is a difference between the traffic of the four data packets and the first preset value.

In an embodiment, after the PDCP layer sorts DATA1, DATA2, DATA3, and DATA4, if the network device determines that a time interval at which the PDCP layer sends data packets is not less than the second preset value, the network device determines traffic of M data packets sent in a current slot by using the PDCP layer, where the traffic of the M data packets is rounded up to the first preset value. In other words, maximum traffic that can be allowed to be sent is sent in the current slot. Traffic that exceeds the first preset value is placed into a buffer of the PDCP layer, and remaining traffic continues to be sent in a subsequent slot, where the remaining traffic is a difference between the traffic of the four data packets and the first preset value.

Figure 5:
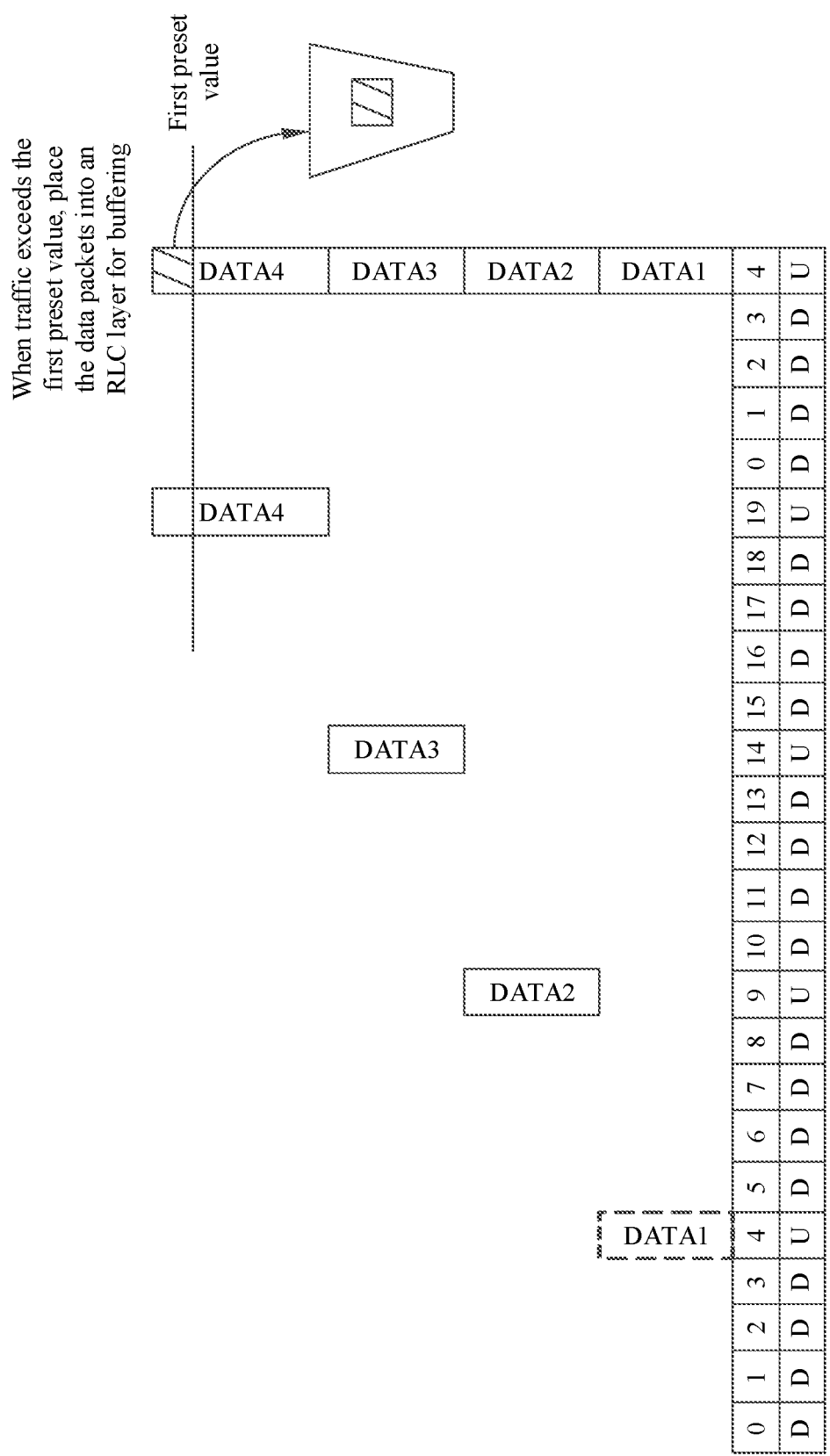
FIG. 5 is a schematic diagram of a traffic shaping process at an RLC layer according to an embodiment of this application.

FIG. 5 is a schematic diagram of a traffic shaping process at the RLC layer according to an embodiment of this application.

It is assumed that in a subframe 4, the terminal device sends DATA1, but the network device does not receive DATA1. In a subframe 9, a subframe 14, and a subframe 19, the terminal device sends DATA2, DATA3, and DATA4 respectively, and the network device receives DATA2, DATA3, and DATA4 and sends DATA2, DATA3, and DATA4 to the RLC layer from a MAC layer. In an LTE communication system, after sorting DATA1, DATA2, DATA3, and DATA4, the RLC layer may send the four data packets to a higher layer.

In an embodiment, after the RLC layer sorts DATA1, DATA2, DATA3, and DATA4, if the network device determines, by using the RLC layer, that traffic of the four data packets is not less than the first preset value, the network device determines traffic of M data packets sent in a current subframe by using the RLC layer, where the traffic of the M data packets is rounded up to the first preset value. In other words, maximum traffic that can be allowed to be sent is sent in the current subframe. Traffic that exceeds the first preset value is placed into a buffer of the RLC layer, and remaining traffic continues to be sent in a subsequent subframe, where the remaining traffic is a difference between the traffic of the four data packets and the first preset value.

In an embodiment, after the RLC layer sorts DATA1, DATA2, DATA3, and DATA4, if the network device determines that a time interval at which the RLC layer sends data packets is not less than the second preset value, the network device determines traffic of M data packets sent in a current subframe by using the RLC layer, where the traffic of the M data packets is rounded up to the first preset value. In other words, maximum traffic that can be allowed to be sent is sent in the current subframe. Traffic that exceeds the first preset value is placed into a buffer of the RLC layer, and remaining traffic continues to be sent in a subsequent subframe, where the remaining traffic is a difference between the traffic of the four data packets and the first preset value.

In the embodiment corresponding to FIG. 3 of this application, instantaneous burst traffic is shaped by setting a shaping condition, to reduce a burst rate. When the traffic or the time interval reaches the preset value, the shaping layer sends maximum traffic that can be allowed to be sent in the current slot or subframe, thereby reducing a packet loss on a transmission network without introducing a large delay, and improving service experience in a wireless communication TDD system.

Figure 6:
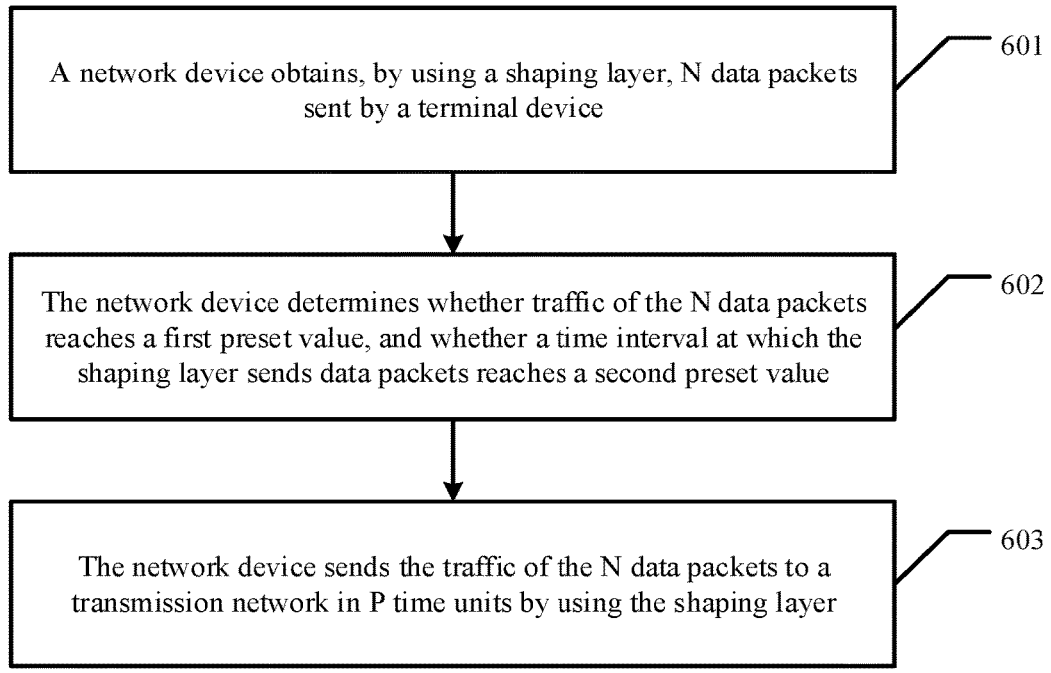
FIG. 6 is a schematic flowchart of another traffic shaping method according to an embodiment of this application.

FIG. 6 is a schematic flowchart of another traffic shaping method according to an embodiment of this application.

As shown in FIG. 6, the another traffic shaping method provided in this embodiment of this application may include the following steps.

601. A network device obtains, by using a shaping layer, N data packets sent by a terminal device.

Step 601 may be understood with reference to step 201 in the embodiment corresponding to FIG. 2. Details are not described herein again.

602. The network device determines whether traffic of the N data packets reaches a first preset value, and whether a time interval at which the shaping layer sends data packets reaches a second preset value.

The network device determines whether the traffic of the N data packets reaches the first preset value, and determines whether the time interval at which the shaping layer sends data packets reaches the second preset value. The first preset value may be a capacity threshold. For example, the capacity threshold may be set to traffic transmitted in one slot or in one subframe based on a minimum bandwidth of a transmission network. The second preset value may be a time threshold. For example, the time threshold may be set to an interval of discontinuous uplink slots or subframes.

603. The network device sends the traffic of the N data packets to the transmission network in P time units by using the shaping layer.

P is a ratio of the second preset value to the time interval at which the shaping layer sends data packets. If the traffic of the N data packets does not reach the first preset value and the time interval at which the shaping layer sends data packets does not reach the second preset value, the network device sends the traffic of the N data packets to the transmission network in the P time units by using the shaping layer, where P is the ratio of the second preset value to the time interval at which the shaping layer sends data packets.

In an embodiment, the network device sends the traffic of the N data packets to the transmission network averagely in the P time units by using the shaping layer.

The following separately uses examples in which the shaping layer is a PDCP layer and an RLC layer for description.

Figure 7:
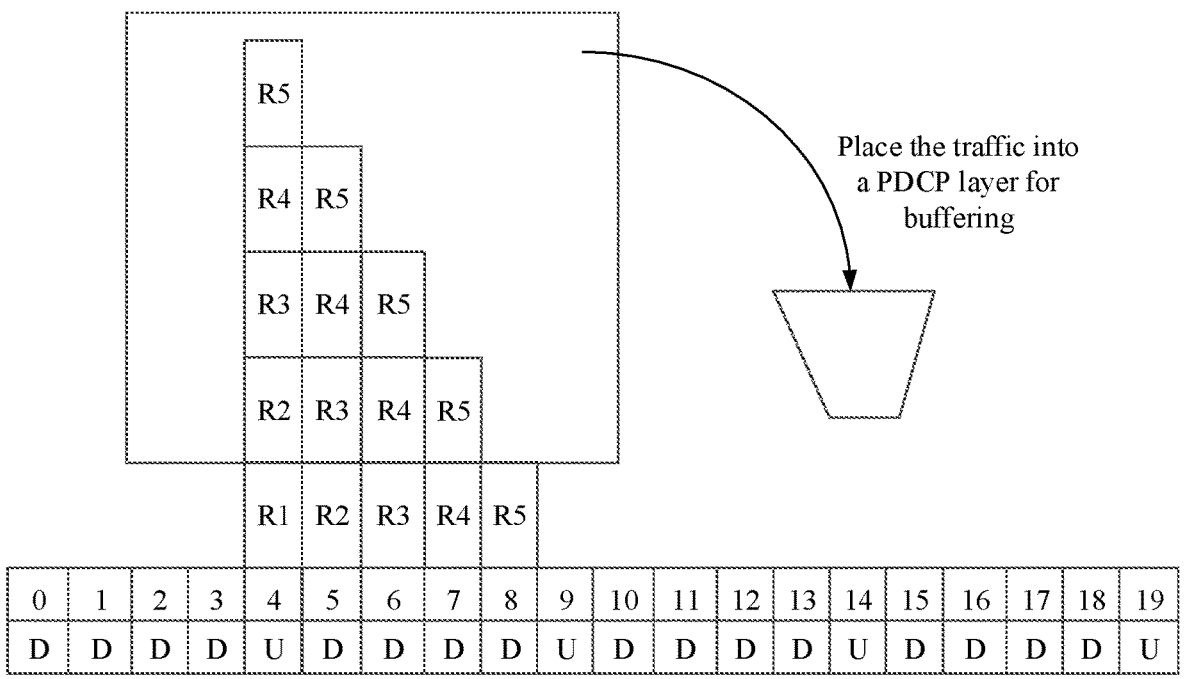
FIG. 7 is a schematic diagram of another traffic shaping process at a PDCP layer according to an embodiment of this application.

FIG. 7 is a schematic diagram of another traffic shaping process at the PDCP layer according to an embodiment of this application.

It is assumed that in a slot 4, the terminal device sends DATA1, the network device correctly receives DATA1, and sends DATA1 to the PDCP layer from the RLC layer. In a 5G communication system, the PDCP layer determines that received data packets have been sorted in sequence, and may send DATA1 to a higher layer.

If the network device determines, by using the PDCP layer, that traffic of DATA1 does not reach the first preset value and a time interval at which the shaping layer sends data packets does not reach the second preset value, the network device sends the traffic of the N data packets to the transmission network in P slots by using the shaping layer. P is a ratio of the second preset value to the time interval at which the shaping layer sends data packets. Descriptions are provided with reference to FIG. 7. Assuming that the second preset value is five slots, and the time interval at which the shaping layer sends data packets is one slot, P is 5. After the PDCP layer receives DATA1, the traffic of DATA1 is sent in five slots. In an embodiment, the packets may be sent averagely in the five slots. In another specific implementation, the packets may alternatively not be sent averagely in the five slots. FIG. 7 is a schematic diagram of sending data packets averagely in the five slots. Specifically, if the traffic of DATA1 does not reach the first preset value and the time interval at which the shaping layer sends data packets does not reach the second preset value, the network device sends the traffic of DATA1 to the transmission network averagely in the five slots by using the shaping layer. As shown in FIG. 7, in the slot 4, the PDCP sends traffic R1 to the higher layer, where R1 is one-fifth of the traffic of DATA1. The PDCP layer buffers traffic R2, R3, R4, and R5, where R2, R3, R4, and R5 each are one-fifth of the traffic of DATA1, and a sum of R1, R2, R3, R4, and R5 is the traffic of DATA1. In a slot 5, the PDCP sends the traffic R2 to the higher layer, and the PDCP layer buffers the traffic R3, R4, and R5. In a slot 6, the PDCP sends the traffic R3 to the higher layer, and the PDCP layer buffers the traffic R4 and R5. In a slot 7, the PDCP sends the traffic R4 to the higher layer, and the PDCP layer buffers the traffic R5. In the slot 7, the PDCP sends the traffic R5 to the higher layer.

In an embodiment, a value of P may also be determined in another manner. For example, the network device may preset that the traffic is divided into P parts. In the embodiment in FIG. 7, the PDCP layer divides the traffic of DATA1 into P parts. In an actual application process, the value of P may be set according to requirements.

Figure 8:
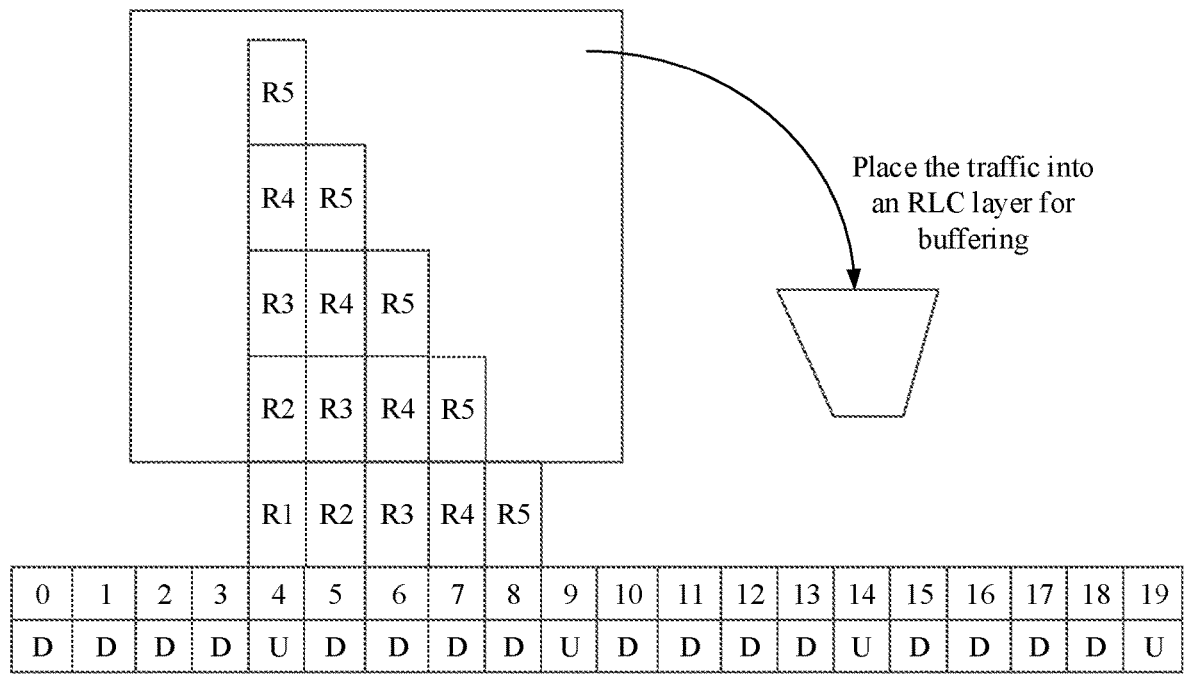
FIG. 8 is a schematic diagram of another traffic shaping process at an RLC layer according to an embodiment of this application.

FIG. 8 is a schematic diagram of another traffic shaping process at the RLC layer according to an embodiment of this application.

It is assumed that in a subframe 4, the terminal device sends DATA1, the network device correctly receives DATA1, and sends DATA1 to the RLC layer from a MAC layer. In an LTE communication system, the RLC layer determines that received data packets have been sorted in sequence, and may send DATA1 to a higher layer.

If the network device determines, by using the RLC layer, that traffic of DATA1 does not reach the first preset value and a time interval at which the shaping layer sends data packets does not reach the second preset value, the network device sends the traffic of the N data packets to the transmission network in P slots by using the shaping layer. P is a ratio of the second preset value to the time interval at which the shaping layer sends data packets. Descriptions are provided with reference to FIG. 8. Assuming that the second preset value is five subframes, and the time interval at which the shaping layer sends data packets is one subframe, P is 5. After the RLC layer receives DATA1, the traffic of DATA1 is sent in five subframes. In an embodiment, the packets may be sent averagely in the five subframes. In another specific implementation, the packets may alternatively not be sent averagely in the five subframes. FIG. 8 is a schematic diagram of sending data packets averagely in the five subframes. Specifically, if the traffic of DATA1 does not reach the first preset value and the time interval at which the shaping layer sends data packets does not reach the second preset value, the network device sends the traffic of DATA1 to the transmission network averagely in the five slots by using the shaping layer. As shown in FIG. 8, in the subframe 4, the RLC sends traffic R1 to the higher layer, where R1 is one-fifth of the traffic of DATA1. The RLC layer buffers traffic R2, R3, R4, and R5, where R2, R3, R4, and R5 each are one-fifth of the traffic of DATA1, and a sum of R1, R2, R3, R4, and R5 is the traffic of DATA1. In a subframe 5, the RLC sends the traffic R2 to the higher layer, and the RLC layer buffers the traffic R3, R4, and R5. In a subframe 6, the RLC sends the traffic R3 to the higher layer, and the RLC layer buffers the traffic R4 and R5. In a subframe 7, the RLC sends the traffic R4 to the higher layer, and the RLC layer buffers the traffic R5. In the subframe 7, the RLC sends the traffic R5 to the higher layer.

In an embodiment, a value of P may also be determined in another manner. For example, the network device may preset that the traffic is divided into P parts. In the embodiment in FIG. 8, the RLC layer divides the traffic of DATA1 into P parts. In an actual application process, the value of P may be set according to requirements.

In the embodiment corresponding to FIG. 6 of this application, when the traffic of the N data packets does not reach the first preset value and the time interval at which the shaping layer sends data packets does not reach the second preset value, the traffic of the N data packets is sent to the transmission network in P slots or subframes. This avoids sending of a large amount of data in one slot or subframe. In a multi-user scenario, network utilization can be significantly improved in this embodiment of this application.

The foregoing mainly describes the method provided in the embodiments of this application. It may be understood that, to implement the foregoing functions, the network device includes a corresponding hardware structure and/or a corresponding software module for implementing each function. A person skilled in the art should be easily aware that, in combination with the examples of modules and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of a hardware structure, the network device in FIG. 2 to FIG. 8 may be implemented by one physical device, may be jointly implemented by a plurality of physical devices, or may be a logical function module in one physical device. This is not specifically limited in the embodiments of this application.

Figure 9:
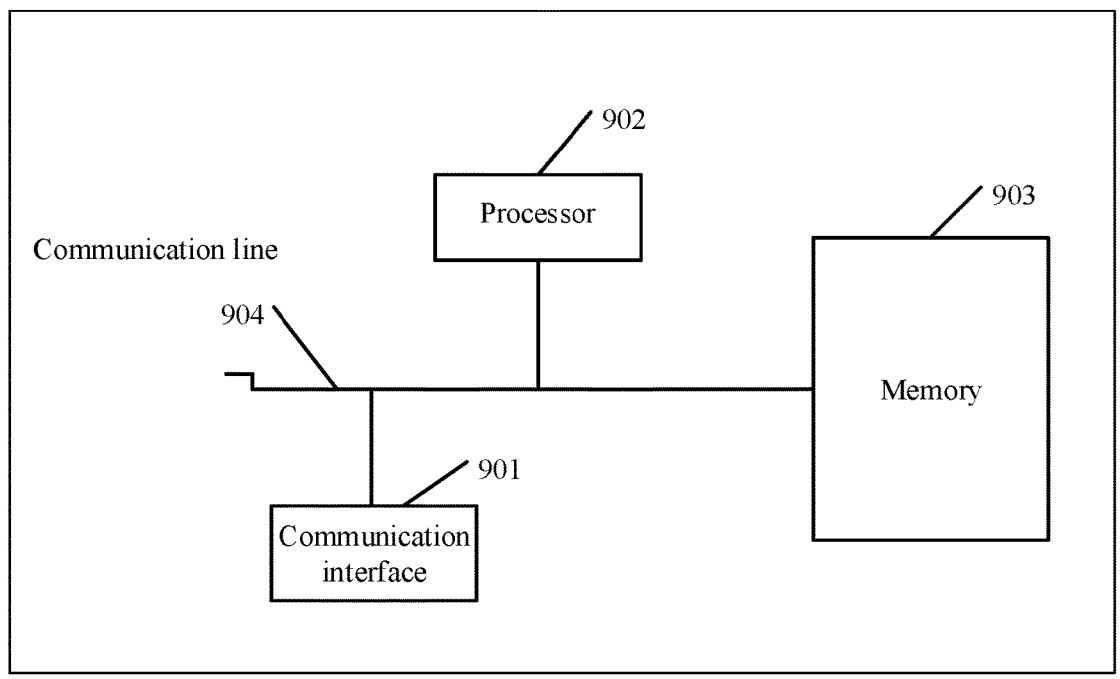
FIG. 9 is a schematic diagram of a hardware structure of a communication device according to an embodiment of this application.

The network device may be implemented by a communication device in FIG. 9. FIG. 9 is a schematic diagram of a hardware structure of a communication device according to an embodiment of this application. The communication device includes a communication interface 901 and a processor 902, and may further include a memory 903.

The communication interface 901 can be any apparatus such as a transceiver, and is configured to communicate with another device or a communication network.

The processor 902 includes but is not limited to one or more of a central processing unit (CPU), a network processor (NP), an application-specific integrated circuit (ASIC), or a programmable logic device (PLD). The PLD may be a complex programmable logic device (CPLD), a field-programmable gate array (FPGA), generic array logic (GAL), or any combination thereof. The processor 902 is responsible for a communication line 904 and general processing, and may further provide various functions, including timing, peripheral interfacing, voltage regulation, power management, and another control function. The memory 903 may be configured to store data used by the processor 902 when performing an operation.

The memory 903 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), or a magnetic disk storage medium or another magnetic storage device, or any other medium that can be used to carry or store expected program code in a form of instructions or a data structure and that can be accessed by a computer. This is not limited herein. The memory may exist independently, and is connected to the processor 902 by using the communication line 904. Alternatively, the memory 903 may be integrated with the processor 902. If the memory 903 and the processor 902 are components independent of each other, the memory 903 is connected to the processor 902. For example, the memory 903 may communicate with the processor 902 by using the communication line. The network interface 901 may communicate with the processor 902 by using the communication line, and the network interface 901 may be directly connected to the processor 902.

The communication line 904 may include any quantity of interconnected buses and bridges, and the communication line 904 link together various circuits that include one or more processors 902 represented by the processor 902 and a memory represented by the memory 903. The communication line 904 may further link together various other circuits such as a peripheral device, a voltage regulator, and a power management circuit. These are well known in the art, and therefore are not further described in this application.

In an embodiment, the network device may include a communication interface, configured to obtain N data packets sent by a terminal device by using a shaping layer, where N is an integer greater than 0, the N data packets are submitted in sequence, and the shaping layer is configured to sort the N data packets.

The network device may further include a processor, where the processor is coupled to the communication interface, and is configured to compare traffic of the N data packets or a time interval at which the shaping layer sends data packets with a preset value when determining that none of the N data packets obtained by the communication interface is lost or that the N data packets are not out of order.

The communication interface is further configured to shape the traffic based on a comparison result of the processor by using the shaping layer.

In an embodiment, the processor is specifically configured to determine whether the traffic of the N data packets obtained by the communication interface reaches a first preset value.

The communication interface is specifically configured to send, if the processor determines that the traffic reaches the first preset value, M data packets to a transmission network in a current time period by using the shaping layer, where traffic of the M data packets is rounded up to the first preset value.

In an embodiment, the processor is specifically configured to determine whether the time interval at which the shaping layer sends data packets reaches a second preset value.

The communication interface is specifically configured to send, if the processor determines that the time interval reaches the second preset value, M data packets to a transmission network in a current time period by using the shaping layer, where traffic of the M data packets is rounded up to a first preset value, and the first preset value is preset.

In an embodiment, the processor is specifically configured to: determine whether the traffic of the N data packets reaches a first preset value, and determine whether the time interval at which the shaping layer sends data packets reaches a second preset value.

The communication interface is specifically configured to send, if the processor determines that the traffic of the N data packets does not reach the first preset value and the time interval at which the shaping layer sends data packets does not reach the second preset value, the traffic of the N data packets to a transmission network in P time units by using the shaping layer, where P is a ratio of the second preset value to the time interval at which the shaping layer sends data packets.

In an embodiment, the communication interface is specifically configured to send the traffic of the N data packets to the transmission network averagely in the P time units by using the shaping layer.

In an embodiment, the shaping layer is a packet data convergence protocol (PDCP) layer of the network device in a 5th generation mobile communication technology (5G) system.

In an embodiment, the shaping layer is a radio link control (RLC) layer of the network device in a long term evolution system (LTE) system.

Figure 10:
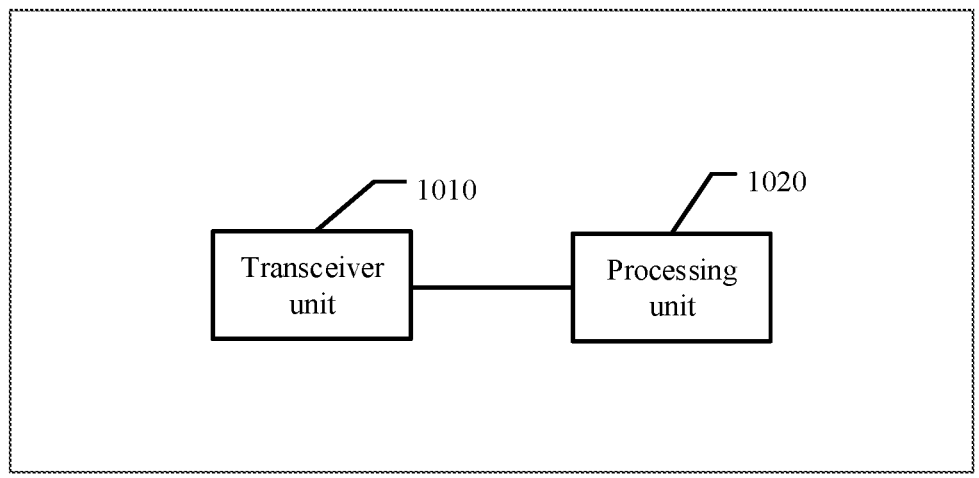
FIG. 10 is a schematic diagram of a structure of a network device according to an embodiment of this application.

In this embodiment of this application, the communication interface may be considered as a transceiver unit of the network device, the processor that has a processing function may be considered as a processing unit of the network device, and the memory may be considered as a storage unit of the network device. As shown in FIG. 10, the network device includes a transceiver unit 1010 and a processing unit 1020. The transceiver unit may also be referred to as a transceiver, a transceiver machine, a transceiver apparatus, or the like. The processing unit may also be referred to as a processor, a processing board, a processing module, a processing apparatus, or the like. Optionally, a component configured to implement a receiving function in the transceiver unit 1010 may be considered as a receiving unit, and a component configured to implement a sending function in the transceiver unit 1010 may be considered as a sending unit, that is, the transceiver unit 1010 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

In an embodiment, the transceiver unit 1010 is configured to perform the receiving and sending operations on a network device side in step 201 and step 203 in FIG. 2, and/or the transceiver unit 1010 is further configured to perform other receiving and sending steps on the network device side in the embodiments of this application. The processing unit 1020 is configured to perform step 202 in FIG. 2, and/or the processing unit 1020 is further configured to perform processing steps on the network device side in the embodiments of this application.

In an embodiment, the transceiver unit 1010 is configured to perform the receiving and sending operations on a network device side in step 301 and step 303 in FIG. 3, and/or the transceiver unit 1010 is further configured to perform other receiving and sending steps on the network device side in the embodiments of this application. The processing unit 1020 is configured to perform step 302 in FIG. 3, and/or the processing unit 1020 is further configured to perform processing steps on the network device side in the embodiments of this application.

In an embodiment, the transceiver unit 1010 is configured to perform the receiving and sending operations on a network device side in step 601 and step 603 in FIG. 6, and/or the transceiver unit 1010 is further configured to perform other receiving and sending steps on the network device side in the embodiments of this application. The processing unit 1020 is configured to perform step 602 in FIG. 6, and/or the processing unit 1020 is further configured to perform processing steps on the network device side in the embodiments of this application.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, the procedures or the functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the steps of the methods in the embodiments may be implemented by a program instructing related hardware. The program may be stored in a computer-readable storage medium. The storage medium may include a ROM, a RAM, a magnetic disk, or an optical disc, or the like.

The foregoing describes in detail the traffic shaping method, the network device, and the computer program product provided in the embodiments of this application. The principle and implementation of this application are described herein through specific examples. The description about the embodiments is merely provided to help understand the method and core ideas of this application. A person of ordinary skill in the art can make variations to this application in terms of the specific implementations and application scopes based on the ideas of this application. Therefore, the content of specification shall not be understood as a limit to this application.

What is claimed is:

1. A traffic shaping method, wherein the method is applied to a wireless communication time division duplex (TDD) mode, and comprises:
    obtaining, by a network device using a shaping layer, N data packets sent by a terminal device, wherein N is an integer greater than 0, the N data packets are submitted in sequence, and the shaping layer is configured to sort the N data packets;
    comparing, by the network device, traffic of the N data packets with a first preset value by determining whether the traffic of the N data packets reaches the first preset value, or comparing a time interval at which the shaping layer sends data packets with a second preset value, based on the network device determining that none of the N data packets is lost or that the N data packets are not out of order; and
    shaping, by the network device, the traffic based on a comparison result using the shaping layer.

2. The traffic shaping method according to claim 1, wherein
    the shaping, by the network device, the traffic based on a comparison result using the shaping layer comprises:
    sending, by the network device when the traffic reaches the first preset value, M data packets to a transmission network in a current time period by using the shaping layer, wherein traffic of the M data packets is rounded up to the first preset value, wherein M is an integer greater than zero.

3. The traffic shaping method according to claim 1, wherein the comparing further comprises:
   determining, by the network device, whether the time interval at which the shaping layer sends data packets reaches the second preset value; and
   wherein the shaping, by the network device, the traffic based on a comparison result using the shaping layer comprises:
   sending, by the network device when the time interval reaches the second preset value, M data packets to a transmission network in a current time period by using the shaping layer, wherein traffic of the M data packets is rounded up to the first preset value, wherein M is an integer greater than zero.

4. The traffic shaping method according to claim 1, wherein the comparing further comprises:
   determining, by the network device, whether the time interval at which the shaping layer sends data packets reaches the second preset value; and
   wherein the shaping, by the network device, the traffic based on a comparison result using the shaping layer comprises:
   when the traffic of the N data packets does not reach the first preset value and the time interval at which the shaping layer sends data packets does not reach the second preset value, sending, by the network device, the traffic of the N data packets to a transmission network in P time units using the shaping layer, wherein P is a ratio of the second preset value to the time interval at which the shaping layer sends data packets.

5. The traffic shaping method according to claim 4, wherein the sending, by the network device, the traffic of the N data packets to a transmission network in P time units using the shaping layer comprises:
   sending, by the network device, the traffic of the N data packets to the transmission network spread evenly across the P time units using the shaping layer.

6. The traffic shaping method according to claim 1, wherein the shaping layer is a packet data convergence protocol (PDCP) layer of the network device in a 5th generation mobile communication technology (5G) system.

7. The traffic shaping method according to claim 1, wherein the shaping layer is a radio link control (RLC) layer of the network device in a long term evolution (LTE) system.

8. A network device, comprising:
   a communication interface, configured to obtain N data packets sent by a terminal device using a shaping layer, wherein N is an integer greater than 0, the N data packets are submitted in sequence, and the shaping layer is configured to sort the N data packets; and
   a processor, wherein the processor is coupled to the communication interface, and is configured to compare traffic of the N data packets with a first preset value by determining whether the traffic of the N data packets reaches the first preset value, or compare a time interval at which the shaping layer sends data packets with a second preset value, based on the processor determining that none of the N data packets obtained by the communication interface is lost or that the N data packets are not out of order; wherein
   the communication interface is further configured to shape the traffic based on a comparison result of the processor using the shaping layer.

9. The network device according to claim 8, wherein the communication interface is configured to send, when the processor determines that the traffic reaches the first preset value, M data packets to a transmission network in a current time period using the shaping layer, wherein traffic of the M data packets is rounded up to the first preset value, wherein M is an integer greater than zero.

10. The network device according to claim 8, wherein the processor is configured to determine whether the time interval at which the shaping layer sends data packets reaches the second preset value; and
    the communication interface is configured to send, when the processor determines that the time interval reaches the second preset value, M data packets to a transmission network in a current time period using the shaping layer, wherein traffic of the M data packets is rounded up to the first preset value, wherein M is an integer greater than zero.

11. The network device according to claim 8, wherein the processor is configured to:
    determine whether the time interval at which the shaping layer sends data packets reaches the second preset value; and
    the communication interface is configured to send, when the processor determines that the traffic of the N data packets does not reach the first preset value and the time interval at which the shaping layer sends data packets does not reach the second preset value, the traffic of the N data packets to a transmission network in P time units using the shaping layer, wherein P is a ratio of the second preset value to the time interval at which the shaping layer sends data packets.

12. The network device according to claim 11, wherein the communication interface is configured to send the traffic of the N data packets to the transmission network spread evenly across the P time units by using the shaping layer.

13. The network device according to claim 8, wherein the shaping layer is a packet data convergence protocol (PDCP) layer of the network device in a 5th generation mobile communication technology (5G) system.

14. The network device according to claim 8, wherein the shaping layer is a radio link control (RLC) layer of the network device in a long term evolution (LTE) system.

* * * * *